US006828280B2

(12) United States Patent
England et al.

(10) Patent No.: US 6,828,280 B2
(45) Date of Patent: Dec. 7, 2004

(54) METHODS FOR STIMULATING HYDROCARBON PRODUCTION

(75) Inventors: Kevin W. England, Houston, TX (US); Curtis L. Boney, Houston, TX (US); Matthew J. Miller, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 234 days.

(21) Appl. No.: 10/195,704

(22) Filed: Jul. 15, 2002

(65) Prior Publication Data

US 2003/0054962 A1 Mar. 20, 2003

Related U.S. Application Data

(60) Provisional application No. 60/312,340, filed on Aug. 14, 2001.

(51) Int. Cl.$^7$ .............................. E21B 43/26; C09K 3/00
(52) U.S. Cl. ........................ 507/202; 507/207; 507/209; 507/211; 507/221; 507/225; 507/922; 507/923; 166/400; 166/278; 166/308.2; 166/307
(58) Field of Search .................................. 507/922, 923, 507/202, 207, 209, 211, 225, 221; 166/308.2, 307, 400, 278

(56) References Cited

U.S. PATENT DOCUMENTS

| | | | |
|---|---|---|---|
| 5,036,919 A | 8/1991 | Thomas et al. | 166/271 |
| 5,501,275 A | 3/1996 | Card et al. | 166/280 |
| 5,551,516 A | 9/1996 | Norman et al. | 166/308 |
| 5,782,300 A | 7/1998 | James et al. | 166/278 |
| 5,964,295 A | 10/1999 | Brown et al. | 166/308 |
| 5,979,555 A | 11/1999 | Gadberry et al. | 166/270.1 |
| 5,979,557 A | 11/1999 | Card et al. | 166/300 |
| 6,035,936 A | 3/2000 | Whalen | 166/308 |
| 6,140,277 A | 10/2000 | Tibbles et al. | 507/201 |
| 6,194,356 B1 * | 2/2001 | Jones et al. | 507/225 |
| 6,258,859 B1 | 7/2001 | Dahayanake et al. | 516/77 |
| 6,306,800 B1 * | 10/2001 | Samuel et al. | 507/129 |
| 6,410,489 B1 * | 6/2002 | Zhang et al. | 507/202 |
| 6,412,561 B1 * | 7/2002 | Brown et al. | 166/308.2 |
| 6,605,570 B2 * | 8/2003 | Miller et al. | 507/211 |
| 6,776,235 B1 * | 8/2004 | England | 166/271 |
| 2003/0019627 A1 * | 1/2003 | Qu et al. | 166/281 |
| 2003/0134751 A1 * | 7/2003 | Lee et al. | 507/200 |

FOREIGN PATENT DOCUMENTS

GB         2366307 A      4/2001

OTHER PUBLICATIONS

Navarette, R.C., Cawiezel, K. E., and Constien, V. G., "Dynamic Fluid Loss in Hydraulic Fracturing Under Realistic Shear Conditions in High–Permeability Rocks," *SPE Production and Facilities*, Aug. 1996, pp. 138–143.

Economides M.J. and Nolte K.G., *Reservoir Stimulation*, John Wiley and Sons, Ltd, 3$^{rd}$ Edition New York, 2000— Chapter 5, "Basics of Hydraulic Fracturing" by M.B.Smith and J.W. Shlyapobersky, (pp. 5–1 to 5–28).

Economides M.J. and Nolte K.G., *Reservoir Stimulation*, John Wiley and Sons, Ltd, 3$^{rd}$ Edition New York, 2000— Chapter 7, "Fracturing Fluid Chemistry and Proppants" by Janet Gulbis and Richard M.Hogde, (pp. 7–1 to 7–23).

Economides M.J. and Nolte K.G., *Reservoir Stimulation*, John Wiley and Sons, Ltd, 3$^{rd}$ Edition New York, 2000— Chapter 10, "Fracture Treatment Design" by Jack Elbel and Larry Britt, (pp. 10–1 to 10–50).

* cited by examiner

*Primary Examiner*—Philip C. Tucker
(74) *Attorney, Agent, or Firm*—Thomas O. Mitchell; Robin Nava; Briqitte L. Echols (57) ABSTRACT

Methods are provided for stimulation of hydrocarbon production from low permeability formations by hydraulic fracturing, acid fracturing, and hydraulic fracturing followed by gravel packing in a single operation. The methods use a first injected viscous pad made with low concentration uncrosslinked polymer to initiate and propagate the fracture and control fluid loss, followed by a second injected fluid gelled with a viscoelastic surfactant for carrying proppant or acid into the fracture.

29 Claims, 2 Drawing Sheets

INVENTION FRACTURE PARAMETERS

FIG. 1 WATER-FRAC FRACTURE PARAMETERS

FIG. 2 INVENTION FRACTURE PARAMETERS

METHODS FOR STIMULATING HYDROCARBON PRODUCTION

REFERENCE TO RELATED PROVISIONAL APPLICATION

This application claims the benefit of provisional application Ser. No. 60/312,340 filed Aug. 14, 2001.

TECHNICAL FIELD OF THE INVENTION

This Invention relates to stimulation of wells drilled into subterranean formations to improve recovery of hydrocarbons. In particular it relates to hydraulic fracturing and acid fracturing of low permeability producing zones to improve the flowpath available to oil and gas flowing to the wellbore. Most particularly it relates to using less expensive chemicals, less complicated procedures, and less hydraulic horsepower to create fractures that have greater width and higher conductivity than would be produced by other methods when fracturing comparable formations.

BACKGROUND OF THE INVENTION

Stimulating the production of hydrocarbons (or other fluids such as water, brine, and carbon dioxide) is well known. Hydraulic fracturing (pumping a fluid into a wellbore at a pressure and rate sufficient to split open the formation rock), acidizing, or a combination of the two (called acid fracturing or fracture acidizing) are the most common techniques. In hydraulic and acid fracturing, a first, viscous fluid called a "pad" is typically injected into the formation to initiate and propagate the fracture and often to contribute to fluid loss control. This is followed by a second fluid. In hydraulic fracturing the second fluid contains a proppant that keeps the fracture open after the pumping pressure is released. In acid fracturing, the second fluid contains an acid that can dissolve part of the rock, causing irregular etching of the fracture face and removal of some of the mineral matter, resulting in the fracture not completely closing when the pumping is stopped. The choice of the pad fluid depends upon the nature of the subsequently injected fluid and of the formation and on the desired results and attributes of the stimulation job.

Occasionally, hydraulic fracturing is done without a highly viscosified second fluid; this choice is made primarily as a way to reduce the deleterious effect of polymers described below. This technique, sometimes called a "waterfrac" involves using extremely low polymer concentrations, so low that they cannot be effectively crosslinked, throughout the job. This alternative has a major drawback: since there is inadequate viscosity to carry much proppant, high pump rates must be used and only very small concentrations (pounds mass proppant added per gallon of fluid), called "PPA", of proppant can be used. Very little proppant will be placed in the fracture to keep it open after the pumping is stopped.

Pads and fracturing fluids are usually viscosified in one of three ways. If the injected fluid is an oil, it is gelled with certain additives designed for the purpose, such as certain aluminum phosphate compounds. If the fluid is water or brine, for hydraulic or acid fracturing, it is gelled with polymers (usually crosslinked with a boron, zirconium or titanium compound), or with viscoelastic fluids ("VES's") that can be formed using certain surfactants that form appropriately sized and shaped micelles. Polymers, especially crosslinked polymers, often tend to form a "filtercake" on the fracture face, that is they coat out on the fracture face as some fluid leaks off, provided that the rock pores are too small to permit entry of the polymer or crosslinked polymer. Some filtercake is generally desirable for fluid loss control. This process of filtercake formation is also called wallbuilding. VES fluids do not form filtercakes as a result of leak-off. VES leak-off control is viscosity controlled, i.e., the resistance due to the flow of the viscous VES fluid through the formation porosity limits the leak-off rate. The viscosity controlled leak-off rate can be high in certain formation permeabilities because the highly shear-thinning fluid has a low apparent viscosity in high flow velocity areas. Reducing the flow velocity (by correspondingly reducing the pressure gradient or simply as a result of the same injected volumetric flow rate leaking off into the formation through a greater surface area as the fracture grows in length and height) will allow micelle structure to reassemble and will result in regeneration of viscosity and fluid loss control. On the other hand, polymers have two major deficiencies: a) the filtercake, if left in place, can impede subsequent flow of hydrocarbons into the fracture and then into the wellbore, and b) polymer or crosslinked polymer will be left in the fracture itself, impeding or cutting off flow, either by physically blocking the flow path through the proppant pack or by leaving a high viscosity fluid in the fracture. VES fluids do not form a filtercake or leave solids in the fracture. VES fluids therefore leave a cleaner, more conductive and therefore more productive fracture. They are easier to use because they require fewer components and less surface equipment, but they may be more expensive and less efficient than polymers, depending upon the formation permeability and the specific VES system and polymer system.

For expediency, pads are typically chemically similar to the fracture fluids used in the same job. Thus in hydraulic fracturing with water-based crosslinked polymer-containing fluids, the pad is typically a water-based crosslinked or uncrosslinked polymer. Crosslinking decreases the amount of polymer needed but increases complexity and often the cost of the job and usually leaves a more harmful residue on the fracture face or in the fracture after the job. In hydraulic fracturing with water-based VES fluids, the pad is typically also a water-based VES fluid, but all of this fluid leaks off, and it may be expensive.

U.S. Pat. No. 5,036,919 (Ronnie L. Thomas and Curtis L. Boney, issued Aug. 6, 1991), hereby incorporated by reference, describes the benefit and importance of a method of fracturing designed to minimize damage to the fracture proppant pack conductivity by using a less damaging, less thermally stable, viscosifier in the fracture fluid than in the pad. In that case, the pad was an organo-metallic crosslinked polymer-based system and the fracture fluid was preferably a borate-crosslinked polymer-based system.

Whereas, the pad is typically the same chemical system (albeit at different concentrations as the proppant-laden or acid containing stages), optimal performance may be realized by using substantially different fluid chemistry or fluid types for both the pad and proppant-laden or acid containing stages. The pad need not be chemically the same as the fluid used in the later stages since the pad does not need to transport proppant or acid and the stimulation plan may include greater pad leak-off than leak-off of subsequent fracture stages. There is a need in hydraulic and acid fracturing to provide an inexpensive material for the pad that will a) create and propagate a sufficiently wide fracture, b) minimize chemical, equipment and hydraulic horsepower expense, c) form a filtercake to control leak-off during the job (not absolutely needed in all cases, for example not required when acid fracturing with a low viscosity acid) and d) be degradable to maximize subsequent production.

SUMMARY OF THE INVENTION

In low permeability formations being fractured with VES fluids, a low concentration (such as about 10 to about 15 ppt (pounds per thousand gallons fluid)) of uncrosslinked polymer may be used in the pad and provide an inexpensive and effective material for the pad that will a) create and propagate a sufficiently wide fracture, b) minimize complexity and chemicals, equipment and hydraulic horsepower requirements, c) form a filtercake to control leak off during the job (not absolutely needed in all cases, for example not required when acid fracturing with a low viscosity acid) and d) be degradable to maximize subsequent production. This optimizes the pad and the fracture fluid separately for low permeability formations. The viscosity of the uncrosslinked polymer may actually be lower than that of the VES fluid subsequently pumped, but the uncrosslinked polymer is less expensive than crosslinked polymer or than VES, less complicated to use and requires fewer chemicals and less equipment than crosslinked polymer, and, in low permeability formations, will still form a filtercake to increase fracture generation efficiency. Either the pad or the subsequent fracture fluid or both can be foamed or energized, if the surfactants selected to form the VES are known to create stable foams, or if the fluids further comprise foamers and the VES surfactants selected are not anti-foamers. The pad and subsequently pumped fracture fluid may have all the additives typically used in such fluids. The job may be a hydraulic fracture, an acid fracture or a fracture immediately followed by gravel-packing, for example with a screen in place, in a single operation. It is a particularly important aspect of the Invention to employ these fluids and methods in fracturing jobs in which only a small amount of proppant is used (commonly called "waterfracs" or "water-fracs" or "slickwater fracs". It is another particularly important aspect of the Invention that the methods allow pads ahead of VES fracture fluids to be pumped with minimized hydraulic horsepower, number of pumps, etc. relative to conventional fracturing with pad compositions previously known in the art for VES based fluids. It is another aspect of the Invention to generate a higher conductivity fracture than if crosslinked polymer or a high concentration of uncrosslinked polymer was used in the pad. It is yet another aspect of the present Invention to provide sufficient fracture width and fluid loss control while minimizing damage to the proppant pack when proppant is used. A particularly preferred embodiment of the Invention is a method of stimulating production of fluids from subterranean formations penetrated by a wellbore involving injecting a first fluid (the pad), made from an aqueous carrier fluid containing an uncrosslinked polymer at a concentration of less than about 15 pounds per thousand gallons fluid, and then injecting a second fluid containing a thickening amount of a viscoelastic surfactant. The key unifying element of the methods of the Invention is a low concentration of an inexpensive, easy to use uncrosslinked polymer used in the pad to minimize damage due to the pad while then subsequently using a fracturing fluid that is completely non-damaging but nonetheless has excellent proppant carrying properties.

DESCRIPTION OF ILLUSTRATIVE EMBODIMENTS

In hydraulic fracturing according to this Invention, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is viscosified. Increased viscosity results in formation of a wider fracture, thus a larger flowpath. A minimal viscosity is also required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity crosslinked polymer-based aqueous fluid with good to moderate leak-off properties, relatively low polymer loadings, and typically no proppant, into the formation. This initial fluid, typically referred to as a "pad", is usually followed by a second fluid (fracturing fluid) of similar viscosity carrying an initially low concentration and then a gradually increasing concentration of proppant into the extended fractures. The pad initiates and propagates the fracture but does not need to carry proppant. All the fluids tend to "leak-off" into the formation from the fracture being created. Commonly, by the end of the job the entire volume of the pad will have leaked off into the formation. This leak-off is determined and controlled by the properties of the fluid (and additives it may contain) and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the end of the fracture, stopping the lengthening of the fracture and resulting in a subsequent increase in the fracture width. On the other hand, excessive leak-off is undesirable because it may waste valuable fluid and result in reduced efficiency of the job. Proper leak-off control is therefore critical to job success. Many solid particulate additives, such as silica, mica and starch, have been developed to control leak-off.

In acid fracturing methods of the Invention, the injected fluid contains an acid that dissolves a portion of the rock by a process like etching so that, when the pumping is stopped and the pressure is released and the fracture closes, the fracture faces no longer match up and an open path to the wellbore is left in place. This serves the function of the proppant in conventional hydraulic fracturing. The acid may also create wormholes into the rock to form additional pathways, which is usually undesirable in acid fracturing because it wastes acid and draws the acid in undesirable directions. Acids are often viscosified to increase fracture width and to reduce the rate of acid leak-off into the fracture face. Acid fracture jobs are also typically preceded with pads, typically crosslinked polymers, or extremely high concentration uncrosslinked polymers, as in hydraulic fracturing.

Fracture fluids described herein typically also contain other materials such as demulsifiers, corrosion inhibitors, friction reducers, clay stabilizers, scale inhibitors, biocides, breaker aids, mutual solvents, alcohols, surfactants, anti-foam agents, defoamers, viscosity stabilizers, iron control agents, diverters, emulsifiers, foamers, oxygen scavengers, pH control agents, and buffers, and the like. The fracture jobs of the Invention are conducted normally except for the composition, and sometimes amount, of the pad. The pad and the fracturing or other stimulation fluid and their additives are transported to the site, mixed, stored, and pumped in the usual ways for the respective chemicals. In the term "fracture" we include hydraulic fracturing, acid fracturing and combined fracturing followed by gravel packing in a single operation.

The Invention is carried out by considering information about the well, the formation, the fluids available, and criteria for a successful fracture stimulation, and preparing an optimized plan for maximizing stimulated well performance according to the data and the criteria. Such a design will include injection of an amount of a selected pad fluid and an amount of a selected fracture fluid. This is usually done by analyzing the well using fracturing design and evaluation software in which pressure gradients are combined with fracture length and height evolution algorithms, complete leak-off information, and the effects of multiple fluid injections and their temperature changes. Given low concentration uncrosslinked polymer fluids as options for the pad and VES fluids as options for the fracturing or other stimulation fluid, this job design is well within the capability of those skilled in the art.

The theory and practice of hydraulic fracturing, acid fracturing, and fracturing with deliberate tip screen-out are given in detail in Michael J. Economides and Kenneth G, Nolte, eds., *Reservoir Stimulation*, John Wiley and Sons, Ltd, $3^{rd}$ Edition, New York, 2000, in particular Chapter 5, "Basics of Hydraulic Fracturing" by M. B. Smith and J. W. Shlyapobersky (pp. 5-1 to 5-28); Chapter 7, "Fracturing Fluid Chemistry and Proppants" by Janet Gulbis and Richard M. Hodge (pp. 7-1 to 7-23); and Chapter 10, "Fracture Treatment Design" by Jack Elbel and Larry Britt (pp. 10-1 to 10-50).

We define low permeability formations here as having permeabilities of less than about 20 mD, especially less than about 10 mD, and most especially less than about 2 mD. One important issue with polymer-free fluid systems, in low permeability formations, if they are used for both the pad and the proppant carrying fracture fluid, is that there are no solids to aid in controlling fluid loss to the formation during fracturing. In these cases it would be desirable to pump a polymer-based fluid for the pad followed by a VES-based (or other solids-free) fluid to carry proppant or to divert or delay an acid. This might cause some fracture face damage as a result of the solids in the pad, which can be addressed by chemical (usually encapsulated) breakers, which in some cases are chemically equivalent to the chemistry needed to promote faster cleanup of the VES-based fluids.

The pad of the Invention comprises a carrier fluid and a viscosifying polymer. It may additionally contain other additives normally used in such fluids, provided that none of the components of the pad is deleterious to the formation or to the fracture fluid. Fluids used as the pad in the present Invention may typically contain materials such as corrosion inhibitors, friction reducers, clay stabilizers, scale inhibitors, biocides, and the like.

The carrier fluid provides a medium for the transport of the other components into the formation. Preferably, the carrier fluid can be water or brine. Selected organic or inorganic salts or mixtures can be used, provided that they are compatible with all components in the pad, the fracture fluid, the formation and the formation fluids. Solutions containing 1 to 5% by weight potassium chloride (KCl) or ammonium chloride are often used as the base liquid in fracturing fluids and pads to stabilize clays and prevent swelling. Sometimes other brines or sea water may be used. An organic cation salt, such as, in particular, tetramethyl ammonium chloride, is an effective salt at about 0.2 to about 0.5 percent by weight.

Typically, the polymer is water-soluble. Common classes of effective water-soluble polymers include polyvinyl polymers, polymethacrylamides, cellulose ethers, polysaccharides, lignosulfonates, and ammonium, alkali metal, and alkaline earth salts thereof. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinly acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar, carboxymethyl hydroxypropyl guar, and carboxymethyl guar), heteropolysaccharides obtained by the fermentation of starch-derived sugar (e.g., xanthan gum), and ammonium and alkali metal salts thereof. Preferred water-soluble polymers include hydroxyethyl cellulose, starch, scleroglucan, galactomannans, and substituted galactomannans.

The uncrosslinked polymer pad is used at a concentration of up to about 10 ppt if the pad fluid is foamed or energized and up to about 15 ppt if the pad fluid is not foamed. This concentration is lower than that used in pads in fracturing procedures in the past, in which the minimal polymer concentration was about 15 ppt if the polymer was crosslinked or foamed and about 20 ppt if the polymer was uncrosslinked. U.S. Pat. No. 5,036,919 (Ronnie L. Thomas and Curtis L. Boney, issued Aug. 6, 1991), hereby incorporated by reference, describes hydraulic fracturing with crosslinked guar-based polymer fluids, which may be foamed, and states that the polymer loading in the pad may be from about 20 to about 80 ppt (pounds per thousand gallons fluid). The minimal polymer concentration depends upon the dimensions of the pore system of the formation, the pump rate, the desired fracture dimensions, and the choice of polymer and its properties as they affect wallbuilding and the ability of the polymer to viscosify the pad fluid. The minimal polymer concentration is about 2 ppt for synthetic polymers such as polyacrylamide and about 10 ppt for natural polymers such as guars and substituted guars. These minima are the same whether the pad fluid is foamed or not. The optimal polymer concentration can be determined by choosing the desired leak-off parameters and measuring leak-off with samples of the intended fluids and of the formation or of a rock similar to the formation. Leak-off is defined by three terms: "spurt", which is the initial rapid leak-off of fluid before a filtercake barrier is formed on the fracture face and is measured in gallons/100 square feet, and, for the subsequent leak-off that occurs even after a filtercake is formed and is governed by the viscosity and the wall-building propensity: Cw, the wall-building fluid loss coefficient, and Cv, the viscosity controlled fluid loss coefficient. Cw is not applicable where there is no wall-building material present. Cv is not applicable where there is a low, finite Cw. Cw and Cv are measured in $ft/min^{1/2}$. Preferred values of spurt, Cw and Cv respectively are 0 to about 5, about 0.001 to about 0.05, and about 0.001 to about 0.05; more preferred values are 0 to about 2, about 0.001 to about 0.008, and about 0.001 to about 0.008; most preferred values are 0 to about 1, about 0.001 to about 0.003, and about 0.001 to about 0.003. A test method for determining these values is given in Navarrete, R. C., Caweizel, K. E., and Constien, V. G.: "Dynamic Fluid Loss in Hydraulic Fracturing Under Realistic Shear Conditions in High-Permeability Rocks," SPE Production and Facilities, pp 138–143 (August, 1996).

The pad may be foamed or energized with a gas such as air, nitrogen, carbon dioxide or mixtures thereof to provide some energy and to decrease the amount of chemicals needed. In this embodiment, any surfactant capable of allowing sufficient foaming of the fluid (i.e. at least about 50%, preferably about 70%, gas by volume at one atmosphere pressure and about 20–40° C.) can be used in the fluid. The selection of a suitable surface active agent or agents to form the foam is within the ability of those skilled in the art. Preferred surfactants are those that are effective when incorporated into water in a concentration of about 5 volume percent or less and are compatible with all components in the pad, the fracture fluid, the formation and the formation fluids.

In a typical propped hydraulic fracturing treatment, the pad fluid is designed to completely leak off into the formation; this complete leak-off ideally coincides precisely with the termination of pumping of the proppant stages (pumping a slurry containing proppant) so that the newly created fracture is propped open. Thus the volume of the pad, relative to the volume of the fracture fluid, is determined by a large number of factors governed by the properties of the fluids and of the formation and the desired final fracture dimensions. The selection of a suitable pad volume is within the ability of those skilled in the art, taking into account the affects of the lower polymer concentration of the Invention on pad viscosity and fluid loss.

Because the polymer in the pad is pumped only ahead of the polymer-free fracture fluid containing the proppant, the proppant bed left in the fracture after the job does not contain significant and deleterious amounts of solids, as would be the case if the fracture fluid contained any polymer.

The methods of the present Invention work satisfactorily in formations in which the pore throats at the fracture faces are sufficiently small that the uncrosslinked polymer molecules in the pad cannot enter the formation, but rather form a filtercake on the fracture faces (except in some cases, for example acid fracturing with a low viscosity ungelled fluid). The most common way to determine whether this criterion is met is through measurement or estimation of the formation permeability. The preferred formation permeability for the present Invention is less than about 20 mD; more preferred is less than about 10 mD; most preferred is less than about 2 mD. If this criterion is not met, then a pad having a composition known in the art, such as a crosslinked polymer, a high concentration of an uncrosslinked polymer or a VES fluid, must be used. In low permeability formations, only minimal fluid loss control is generally needed, and provision of viscosity to widen the fracture is a relatively more important role of the pad fluid. In high permeability formations, fluid loss control is more difficult and more critical and uncrosslinked polymer permeates the formations.

While this Invention is not bound by any particular mechanism of operation or theory, it appears that one can define three permeability ranges for a given polymer, crosslinked polymer, or VES fluid:

First, a high permeability range, above which the polymer, crosslinked polymer, or VES fluid micelles can enter the formation without forming a filtercake such that leak-off is high in the absence of added leak-off control agents such as mica or starch.

Second, an intermediate permeability range, depending upon the dimensions of the polymer, crosslinked polymer, or VES fluid micelles, and the stability of the micelles of the VES fluid, the crosslinked polymer could not enter, the uncrosslinked polymer could enter, and the micelles either could enter or could break, then enter as surfactant molecules, and then reform.

Third, a lower permeability below which, still depending upon the dimensions of the polymer, crosslinked polymer, and VES fluid micelles, and the stability of the micelles of the VES fluid, the crosslinked polymer could not enter, the micelles either could enter or could break and enter as surfactant micelles and then reform or not reform, and the uncrosslinked polymer could not enter. (Polymer or crosslinked polymer that does not enter forms a filtercake.)

One skilled in the art and knowing the properties of the formation and the properties of the fluid components could determine when a VES fluid might extensively enter (leak-off into) a formation but an uncrosslinked polymer would not. This would depend, for example, upon the nature of the VES, the structure and molecular weight of the polymer, and the formation permeability and pore structure. In that case, the methods of this Invention would be most valuable. U.S. Pat. No. 5,964,295 (Brown, et. al., issued Oct. 12, 1999; hereby incorporated by reference) describes several types of effective VES fluids, although the Invention is not limited to those VES fluids, and explains the inter-relationships of viscosity, and fluid loss and leak-off in relatively low permeability formations (less than about 10 mD for the VES fluid surfactants described in U.S. Pat. No. 5,964,295, but different for different VES fluid surfactants).

In most, if not all, fracture treatments, leak-off in excess of the minimal amount required for optimal fluid efficiency and fracture dimensions is inevitable and undesirable. Moderate leak-off of the pad in the present Invention, in excess of this minimum, can be acceptable because the pad fluid is less expensive than pad fluids used previously in the art, is less complicated and easier to use than most, and in particular is less expensive than the subsequently injected, proppant-carrying VES fracture fluid.

Reduction of the deleterious effects of polymers left in the fracture is usually brought about by "breakers" that are intended literally to destroy the polymer. These are usually oxidizers or enzymes. VES fluid micelles are usually broken by the natural inflow of hydrocarbons and water or brine, but breakers such as certain salts or alcohols are sometimes also used. Breaker aids such as activators, delay agents or stabilizers may also be used specifically in conjunction with the breakers.

Examples of breakers suitable for use in the method of the present Invention include enzymes such as galactomannanase (for breaking polysaccharides based on galactomannan) and oxidizers such as ammonium persulfate (for breaking all polymers by oxidation and for breaking some of the VES micelles by increasing the salinity). Additionally, the breakers can be encapsulated to delay their release, as is well known in the art. Encapsulation is advantageous because most or all of the polymer to be broken will be in the filtercake and, with encapsulation, that is where the breaker will be after the job. If the breaker is not encapsulated, at least some of it will leak off and not be in contact with the polymer in the filtercake, although some may flow back into contact with the polymer when the fracture pressure is released. Encapsulation is also advantageous because a breaker can be chosen that will break both the polymer and the micelles in the VES. Encapsulation is also advantageous for the delayed reaction it provides.

Any VES based fluid can be used, after the pad, that is compatible with the formation, the formation fluids, and the pad fluid and its components and additives. Particularly effective non-limiting examples of fluids are those described in U.S. Pat. Nos. 5,551,516; 5,964,295; 5,979,555; 5,979,557; 6,140,277; and 6,258,859, all hereby incorporated by reference.

Although the Invention has been described throughout using the term "VES", or "viscoelastic surfactant" to describe the non-polymeric viscosified aqueous fluid in the second stage, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

The proppant may be any synthetic or natural proppant used in hydraulic fracturing, including but not limited to glass beads, ceramic beads, sand, and bauxite. The proppant may be resin coated, provided that the resin and any other chemicals in the coating are compatible with the other chemicals of the Invention, particularly the components of the viscoelastic surfactant fluid micelles.

Also optionally, the fracturing fluid can contain materials designed to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

This Invention may be practiced at any formation temperature, taking into account any cool-down that may occur, at which the pad and fracture fluids and their components, in particular the polymer in the pad and the VES and micelles in the fracture fluid, have the needed properties, in particular stability.

A small amount of proppant may be included in the later stages of the pad, but the proppant would tend to fall out and the pad fluid would not be able to suspend the proppant evenly within the fracture being generated. Low concentrations of proppant, between 0.25 and 1.0 pounds of proppant added per gallon of fluid are often added to the pad stage for a variety of reasons including the following: to cause erosion of perforations, to reduce fluid leak-off into formations with natural fractures or fissures, to reduce near wellbore friction, to bridge at the fracture perimeter to reduce fracture propagation downward, or as a propping agent for improving fracture conductivity. The mass of proppant employed in the pad for these reasons ranges from a few hundred pounds to several tens of thousands of pounds (or from about 0.01% of the total proppant mass to about 10% of the total proppant mass). These proppant sweeps as they are called can be distributed through out the pad, although, they typically are not pumped in the first 10% of the pad. Also, the sweeps tend to be discrete, i.e., a 2500 lb slug of 0.25 pound of proppant added per gallon of fluid (ppa) will be pumped, followed by 10,000 or 20,000 gallons of clean fluid, followed again by another 2500 lb slug of 0.25 ppa fluid.

The pad can also be a gelled oil such as a gelled refined oil (commonly called a "frac oil" in the industry) or any similar material that provides some viscosity, reduces fluid loss, and does not leave damaging solids in the fracture. The following products of Dome Petroleum Limited of Calgary, Alberta, may be used: FRAC OIL 120, FRAC OIL 200, FRAC OIL 300, FRAC OIL 500; as well as SUPER FRAC™ available from Home Oil Company Limited of Calgary; as well as kerosene, diesel fuel, condensate, and crude oil. All of these we will term "gellable oils". In order to prevent any tendency of the oil to break the VES micelles, an aqueous spacer can be used to separate the gelled oil pad from the VES fracture fluid.

In some cases, a certain amount of leak-off is desired, sometimes so that a tip screen-out occurs, a condition in which the proppant forms a bridge at the end of the fracture away from the wellbore, stopping the lengthening of the fracture and resulting in a subsequent increase in the fracture width. For example, hydraulic fracturing followed by gravel-packing in a single operation, sometimes called a frac-pac, fracpac, frac pac, frac and pac, or StimPac, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out) in low permeability formations.

The acid used in the acid fracturing methods of this Invention can be any acid used in acid fracturing, including gelled, self-diverting, and delayed acids. Commonly used, but not limiting, acids are hydrochloric, hydrofluoric, fluoboric, acetic, and formic acids and mixtures thereof and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled by polymers or by VES's.

Although in proppant fracturing the most common way to control fluid loss is to build an impermeable or reduced-permeability filtercake on the fracture walls, in acid fracturing, especially with a low viscosity ungelled acid, pad viscosity is important for fluid loss control. In fact, if the pad of an ungelled acid fracturing treatment is an uncrosslinked polymer fluid, some leak-off control will still result even if no or little filtercake is formed, because as the pad leaks off into the formation it will form a layer of viscous fluid in the first several inches of the formation adjacent to the fracture. This layer can reduce low viscosity ungelled acid leak-off better than a wallbuilding system that dissolves or decomposes in acid. In this special case, an uncrosslinked polymer, at least some of which (depending upon the permeability and the dimensions of the polymer) leaks off into the formation and does not form a filtercake, can be chosen for the pad. Furthermore, the viscous pad could slow acid entry into natural fractures. If a filtercake does form in the treatment, and is desirable but would otherwise decompose or dissolve due to the acid, this problem may be alleviated by either periodically replenishing the filtercake, or utilizing a more stable polymer such as certain polyacrylamide copolymers known in the industry to be more stable to acid. The methods of the Invention can be used in these ways with low-viscosity acid-fracturing fluids in low permeability formations.

Sometimes acid fracturing is performed with a series of alternating pad, acid, pad, acid, etc. stages. The first non-acidic pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as crosslinked polymer, or uncrosslinked polymer at high concentrations such as 40 to 60 ppt. The method of the Invention can be used in low permeability formations in at least the first pad and sometimes in all the pad stages. If wormholes are formed, or very fine natural fractures are encountered, that attract acid and minimize the amount of acid that travels down the intended hydraulic fracture (which is commonly found in the types of limestone and dolomite formations subjected to acid fracturing or fracturing with alternating pad and acid stages), later pads may need additional components such as fine sand, oil-soluble resins, or fine salt, to act as a solid particulate fluid loss control additive and block the wormholes or undesirable natural fractures.

In otherwise conventional hydraulic fracturing, acid fracturing, or fracturing immediately followed by gravel-packing, this Invention allows pads ahead of VES fracture fluids to be pumped with minimized hydraulic horsepower, number of pumps, etc. relative to fracturing with pad compositions previously known in the art for VES-based fluids. This reduced pump expense results from the ability to optimize the viscosity and fluid loss properties of the pad independently from those of the subsequently pumped fluids. Relative to VES pads, the methods of the present Invention are less expensive. Relative to crosslinked polymer pads, the methods of the present Invention are less damaging to the formation and to the fracture (and so result in higher conductivities) and also are less chemically complicated so they are less sensitive to mix-water composition and require less skill, less equipment and less pre-job testing to perform.

Relative to the special case of water-fracs (high rate, fresh water fracturing treatments commonly pumped in Southeast Texas in formations such as the Cotton Valley Taylor Sand), the pad of this Invention with low concentrations of uncrosslinked polymer will a) have better fluid efficiency (due to better fluid loss control) b) enable greater width creation (due to higher viscosity than the pad of a water-frac job that may have only a very small amount of polymer used as a friction reducer) c) will have superior proppant carrying capacity in the proppant-laden stages, and d) will result in lower friction pressure in the proppant-laden stages.

The key unifying element is the low concentration of uncrosslinked polymer used in the pad.

The present Invention can be further understood from the following example. These treatments were compared by modeling using FracCADE, a fracture simulator available from Schlumberger.

EXAMPLE 1

Stimulation of Bonner in East Texas

Identical proppant quantities were used in both fracture designs illustrated in this example (218,000 lb of 30/50 CarboE, which is EconoProp available from Carbo Ceramics, Dallas, Tex.). The Conventional Water-Frac Method required almost 200,000 gallons more fluid than the method of the Invention. Moreover, the Conventional Water-Frac Method was pumped at 100 barrels per minute compared with 50 barrels per minute for the method of the Invention. Despite the high pump rate, and additional fluid, the fracture created by the method taught in this Invention had a higher conductivity over a longer length of created fracture than the conventional method. The fracture created by this Invention had a conductivity of >800 mD-ft (millidarcy-feet) for a length of 850 feet along the fracture, whereas the Conventional Water-Frac method created a fracture that had a maximum conductivity of only 600 mD-ft, and that conductivity declined to less than 250 mD-ft within a length of 500 feet down the fracture. Thus, the fracture of this Invention was more effective at producing hydrocarbons in this example. The primary reason for the difference is that the proppant in the water-frac example settled to the bottom of the fracture and was not transported along the fracture length efficiently, whereas the proppant in the treatment designed following the method of the Invention was efficiently transported down the fracture and experienced minimal settling due to the superior proppant transport characteristics of the fluid. It is important to note that in the method of the Invention, the small amount of uncrosslinked polymer in the pad initiated a fracture into which more proppant could be effectively pumped.

Figure 1:
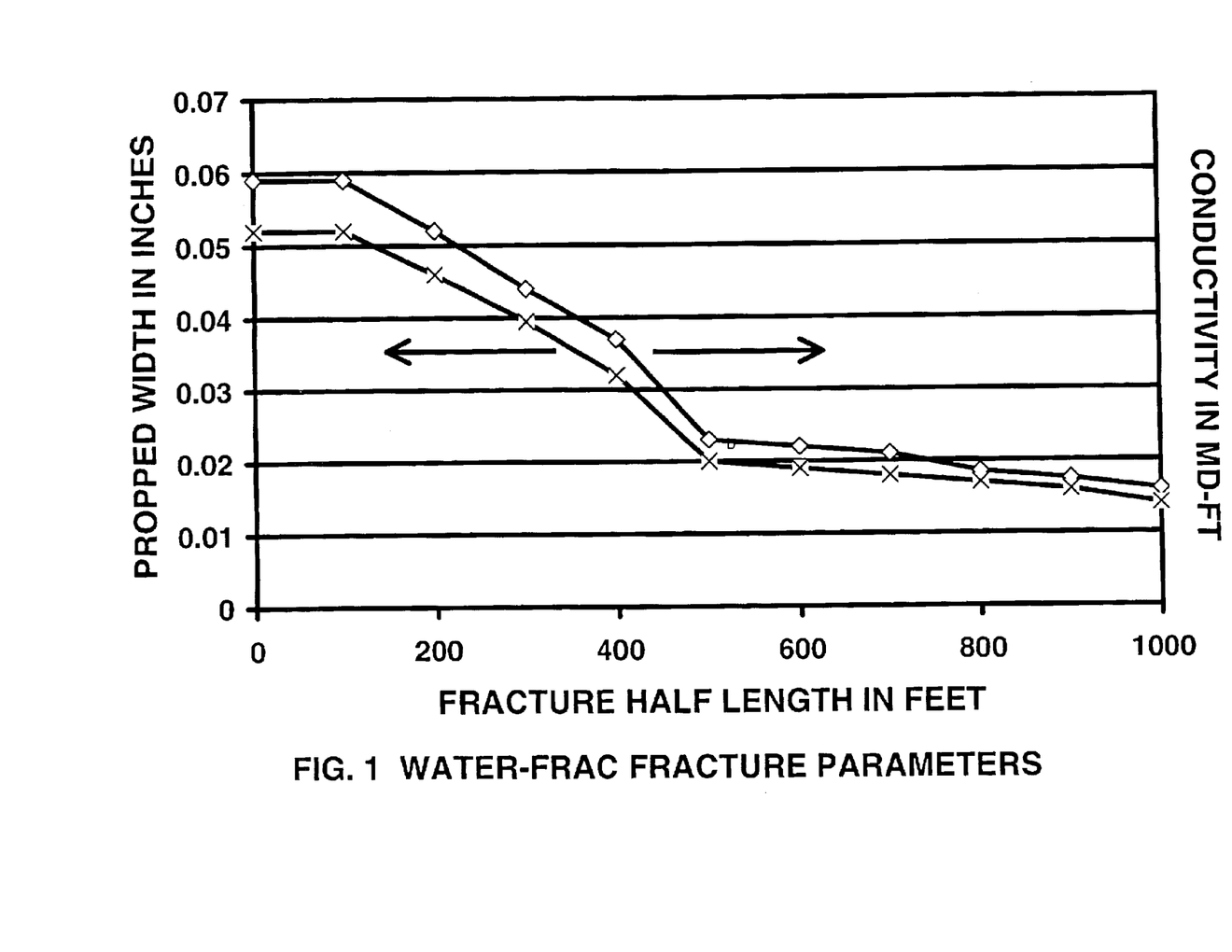
FIG. 1 shows results predicted when fracturing with low proppant concentrations and only water and a friction reducer in the pad and the proppant stages.

Conventional Water-Frac Method: (Slick water pad followed by slick water proppant-laden stages.) Slick water means an essentially unviscosified aqueous fluid. (In this example the slick water contained about 1.4 ppt polyacrylamide as a friction reducer; that value is given in the "Gel. Conc." (Gel Concentration) column.) The results are shown in FIG. 1 and Tables 1 and 2. Note that in the figures, the right-hand scale (conductivity in mD.ft) increases vertically from 0 to 600 in FIG. 1 and from 0 to 1400 in FIG. 2. In the Tables, Water PAD means a pad stage containing no proppant, Gelled Water PAD means a pad stage containing uncrosslinked polymer but no proppant, 0.XY PAD means a pad containing proppant at a concentration of 0.XY PPA (pounds proppant added) per gallon of fluid, flush means a fluid added after the last proppant-laden stage, and, because it contains no viscosifier here, Water-FRAC means slick water with or without proppant. Note that uncrosslinked polymers or VES's can form gels, that is, gelled does not necessarily mean crosslinked.

TABLE 1

Water-Frac -- Job Description

| Stage Name | Pump Rate (bbl/min) | Fluid Name | Stage Fluid Volume (gal) | Gel Conc. (lb/mgal) | Prop. Type and Mesh | Prop. Conc. (PPA) |
|---|---|---|---|---|---|---|
| Water PAD | 100.0 | Water-FRAC | 40000 | 1.4 | | 0.00 |
| 0.25 PAD | 100.0 | Water-FRAC | 5000 | 1.4 | 30/50 CarboE | 0.25 |
| Water PAD | 100.0 | Water-FRAC | 40000 | 1.4 | | 0.00 |
| 0.25 PPA | 100.0 | Water-FRAC | 50000 | 1.4 | 30/50 CarboE | 0.25 |
| 0.5 PPA | 100.0 | Water-FRAC | 100000 | 1.4 | 30/50 CarboE | 0.50 |
| 0.75 PPA | 100.0 | Water-FRAC | 100000 | 1.4 | 30/50 CarboE | 0.75 |
| 1.0 PPA | 100.0 | Water-FRAC | 80000 | 1.4 | 30/50 CarboE | 1.00 |
| flush | 100.0 | 2% KCl Water | 17718 | 1.4 | | 0.00 |

TABLE 2

Water-Frac -- Job Execution

| Stage Name | Stage Fluid Volume (gal) | Cum. Fluid Volume (gal) | Stage Slurry Volume (bbl) | Cum. Slurry Volume (bbl) | Stage Prop (lb) | Cum. Prop. (lb) | Avg. Surface Pressure (psi) | Stage Time (min) | Cum. Time (min) |
|---|---|---|---|---|---|---|---|---|---|
| Water PAD | 40000 | 40000 | 952.4 | 952.4 | 0 | 0 | 10800 | 9.5 | 9.5 |
| 0.25 PAD | 5000 | 45000 | 120.4 | 1072.8 | 1250 | 1250 | 10753 | 1.2 | 10.7 |
| Water PAD | 40000 | 85000 | 952.4 | 2025.1 | 0 | 1250 | 10765 | 9.5 | 20.3 |
| 0.25 PPA | 50000 | 135000 | 1203.7 | 3228.9 | 12500 | 13750 | 10787 | 12.0 | 32.3 |
| 0.5 PPA | 100000 | 235000 | 2434.0 | 5662.9 | 50000 | 63750 | 10749 | 24.3 | 56.6 |
| 0.75 PPA | 100000 | 335000 | 2460.5 | 8123.4 | 75000 | 138750 | 10752 | 24.6 | 81.2 |
| 1.0 PPA | 80000 | 415000 | 1989.6 | 10113.0 | 80000 | 218750 | 10759 | 19.9 | 101.1 |
| flush | 17718 | 432718 | 421.8 | 10534.8 | 0 | 218750 | 10399 | 4.2 | 105.3 |

Figure 2:
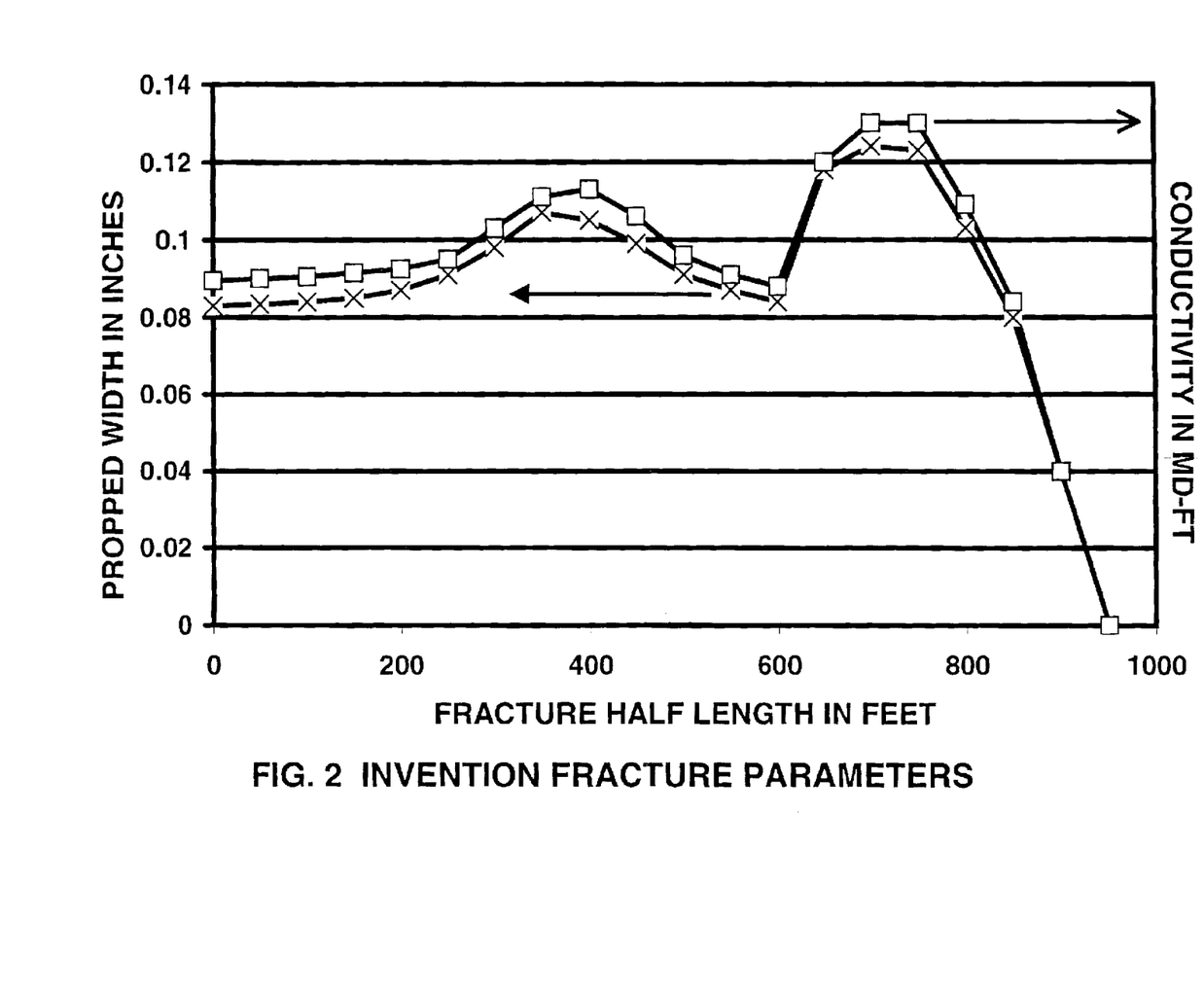
FIG. 2 shows results predicted when fracturing with low proppant concentrations, the uncrosslinked low polymer concentration pad of the Invention, and a VES fluid in the proppant stages.

Method of the Invention: (Gelled Water Pad followed by VES Proppant-Laden Stages.) The results are shown in FIG. 2 and Tables 3 and 4. Terms in these tables have the same meanings as those in Tables 1 and 2. In addition, "Uncrosslinked Polymer" is an uncrosslinked polysaccharide, "VES" is a viscoelastic surfactant, and "VES Gel" is a gel that naturally forms when the viscoelastic surfactant is added to water containing a salt.

TABLE 3

Gelled Water Pad followed by VES Proppant-Laden Fluid -- Job Description

| Stage Name | Pump Rate (bbl/min) | Fluid Name | Stage Fluid Volume (gal) | Gel Conc. (lb/mgal or vol %) | Prop. Type and Mesh | Prop. Conc. (PPA) |
|---|---|---|---|---|---|---|
| Gelled Water PAD | 50.0 | Uncrosslinked Polymer | 40000 | 15 lb/mgal | | 0.00 |
| 0.25 PAD | 50.0 | Uncrosslinked Polymer | 5000 | 15 lb/mgal | 30/50 CarboE | 0.25 |
| Gelled Water PAD | 50.0 | Uncrosslinked Polymer | 40000 | 15 lb/mgal | | 0.00 |
| VES PAD | 50.0 | VES Gel | 30000 | 4 vol % | | 0.00 |
| 0.5 PPA | 50.0 | VES Gel | 10000 | 4 vol % | 30/50 CarboE | 0.50 |
| 1.0 PPA | 50.0 | VES Gel | 10000 | 4 vol % | 30/50 CarboE | 1.00 |
| 1.5 PPA | 50.0 | VES Gel | 15000 | 4 vol % | 30/50 CarboE | 1.50 |
| 2.0 PPA | 50.0 | VES Gel | 20000 | 4 vol % | 30/50 CarboE | 2.00 |
| 2.5 PPA | 50.0 | VES Gel | 20000 | 4 vol % | 30/50 CarboE | 2.50 |
| 3.0 PPA | 50.0 | VES Gel | 30000 | 4 vol % | 30/50 CarboE | 3.00 |
| flush | 50.0 | 2% KCL Water | 17718 | 0.0 | | 0.00 |

TABLE 4

Gelled Pad with VES Proppant-Laden Fluid -- Job Execution
Gelled Pad with VES Proppant-Laden Fluid -- Job Execution

| Stage Name | Stage Fluid Volume (gal) | Cum. Fluid Volume (gal) | Stage Slurry Volume (bbl) | Cum. Slurry Volume (bbl) | Stage Prop (lb) | Cum. Prop. (lb) | Avg. Surface Pressure (psi) | Stage Time (min) | Cum. Time (min) |
|---|---|---|---|---|---|---|---|---|---|
| Water PAD | 40000 | 40000 | 952.4 | 952.4 | 0 | 0 | 10187 | 19.0 | 19.0 |
| .25 PAD | 5000 | 45000 | 120.4 | 1072.8 | 1250 | 1250 | 10133 | 2.4 | 21.5 |
| Water PAD | 40000 | 85000 | 952.4 | 2025.1 | 0 | 1250 | 10167 | 19.0 | 40.5 |
| VES PAD | 30000 | 115000 | 714.3 | 2739.4 | 0 | 1250 | 7975 | 14.3 | 54.8 |
| 0.5 PPA | 10000 | 125000 | 243.4 | 2982.8 | 5000 | 6250 | 5408 | 4.9 | 59.7 |
| 1.0 PPA | 10000 | 135000 | 248.7 | 3231.5 | 10000 | 16250 | 5358 | 5.0 | 64.6 |
| 1.5 PPA | 15000 | 150000 | 381.0 | 3612.5 | 22500 | 38750 | 5149 | 7.6 | 72.3 |
| 2.0 PPA | 20000 | 170000 | 518.6 | 4131.1 | 40000 | 78750 | 4875 | 10.4 | 82.6 |
| 2.5 PPA | 20000 | 190000 | 529.2 | 4660.4 | 50000 | 128750 | 4747 | 10.6 | 93.2 |
| 3.0 PPA | 30000 | 220000 | 809.7 | 5470.1 | 90000 | 218750 | 4842 | 16.2 | 109.4 |
| flush | 17718 | 237718 | 421.8 | 5891.9 | 0 | 218750 | 6146 | 8.4 | 117.8 |

In the tables, PPA is pounds of proppant added per gallon of fluid; bbl is barrels (equal to 42 U.S. gallons), mgal is thousand gallons, min is minutes, gal is gallons, lb is pounds mass, and psi is pounds force/square inch.

An important purpose of water-fracs is to use as little viscosifier and proppant as possible to create a hydraulic fracture. There are significant drawbacks; very high pump rates and very high total slurry volumes must be used, and success is uncertain because it is possible that the fracture may not be adequately propped open. In conventional fracture jobs, these problems are avoided by using highly viscous fracturing fluids and slurries having high proppant contents. Examples 1 and 2 above show that the method of the Invention can use a much smaller total slurry volume to deliver the same amount of proppant at only half the pump rate and at much lower surface pressures. This is accomplished in part by using a low concentration of an uncrosslinked polymer in the pad.

The preceding description of specific embodiments of the present Invention is not intended to be a complete list of every possible embodiment of the Invention. Persons skilled in this field will recognize that modifications can be made to the specific embodiments described here that would be within the scope of the present Invention. For example, while the Invention will have its greatest application in oilfield operations, it may also be utilized in production of other subterranean fluids such as water and carbon dioxide, or in stimulating geothermal wells.

What is claimed is:

1. A method of stimulating production of fluids from a subterranean formation penetrated by a wellbore comprising:
   i) first injecting a first fluid comprising:
      a) an aqueous carrier fluid; and
      b) an uncrosslinked polymer at a concentration of less than about 15 pounds per thousand gallons fluid; and then
   ii) injecting a second fluid comprising a thickening amount of a viscoelastic surfactant.

2. The method of claim 1, wherein the permeability of the formation is less than about 20 mD.

3. The method of claim 2, wherein the permeability of the formation is less than about 10 mD.

4. The method of claim 3, wherein the permeability of the formation is less than about 2 mD.

5. The method of claim 1, wherein the uncrosslinked polymer is selected from the group consisting of polyvinyl polymers, substituted polyvinyl polymers, lignosulfonates, polysaccharides, substituted polysaccharides and salts thereof.

6. The method of claim 5, wherein the uncrosslinked polymer is selected from the group consisting of galactomannans and substituted galactomannans.

7. The method of claim 5, wherein the uncrosslinked polymer is a polyacrylamide.

8. The method of claim 5, wherein the concentration of the uncrosslinked polymer is less than about 10 ppt.

9. The method of claim 1, wherein the first fluid further comprises an additive selected from the group consisting of demulsifiers, corrosion inhibitors, friction reducers, clay stabilizers, scale inhibitors, biocides, breaker aids, mutual solvents, alcohols, surfactants, anti-foam agents, defoamers, viscosity stabilizers, iron control agents, diverters, emulsifiers, foamers, oxygen scavengers, pH control agents, and buffers.

10. The method of claim 1, wherein the method of stimulation is selected from the group consisting of hydraulic fracturing, acid fracturing, and hydraulic fracturing followed by gravel packing.

11. The method of claim 10, wherein the method of stimulation is selected from the group consisting of hydraulic fracturing, and hydraulic fracturing followed by gravel packing and further wherein proppant screens out at the fracture tip.

12. The method of claim 11, wherein the first fluid further comprises proppant.

13. The method of claim 10, wherein the method of stimulation is acid fracturing, and further wherein the steps of injecting the first fluid and injecting the second fluid are repeated in alternation.

14. The method of claim 13, wherein after the first injection of the first fluid the first fluid injected in at least one of the subsequent injections of the first fluid further comprises a solid particulate fluid loss control additive.

15. The method of claim 1, wherein the polymer forms a filtercake.

16. The method of claim 1, wherein the first fluid further comprises a breaker.

17. The method of claim 16, wherein the breaker is encapsulated.

18. The method of claim 17, wherein the second fluid comprises the same breaker as the first fluid.

19. The method of claim 1, wherein the fluid loss spurt is less than about 5 gallons/100 square feet.

20. The method of claim 1, wherein the wall building fluid loss coefficient is less than about 0.008 feet/minute$^{1/2}$.

21. The method of claim 1, wherein the viscosity controlled fluid loss coefficient is less than about 0.008 feet/minute$^{1/2}$.

22. The method of claim 1, wherein the first fluid further comprises a solid particulate fluid loss control additive.

23. The method of claim 1, wherein the first fluid is foamed or energized and comprises a gas selected from the group consisting of nitrogen, air, carbon dioxide and combinations thereof.

24. The method of claim 1, wherein the first fluid is selected from the group consisting of nitrogen, air, carbon dioxide and combinations thereof.

25. The method of claim 1, wherein the second fluid is foamed or energized and comprises a gas selected from the group consisting of nitrogen, air, carbon dioxide and combinations thereof.

26. The method of claim 1, wherein both the first and second fluids are foamed or energized and comprise a gas selected from the group consisting of nitrogen, air, carbon dioxide and combinations thereof.

27. The method of claim 1 wherein the second fluid comprises a thickening amount of a composition that forms vesicles.

28. A method of stimulating production of fluids from a subterranean formation penetrated by a wellbore comprising:
   i) first injecting a first fluid comprising:
      a) an aqueous carrier fluid; and
      b) an uncrosslinked polymer at a concentration of less than about 15 pounds per thousand gallons fluid; and
   ii) injecting a second fluid comprising a thickening amount of a surfactant.

29. A method of stimulating production of fluids from a subterranean formation penetrated by a wellbore comprising:
   i) injecting a first fluid comprising a hydrocarbon gelling compound and a gellable oil; and
   ii) injecting a second fluid comprising a thickening amount of a viscoelastic surfactant.

* * * * *